US012651695B2

(12) United States Patent
Chiu et al.

(10) Patent No.: US 12,651,695 B2
(45) Date of Patent: Jun. 9, 2026

(54) MAGNETIC COMPONENT

(71) Applicant: CYNTEC CO., LTD., Hsinchu (TW)

(72) Inventors: Kun-Ping Chiu, Hsinchu (TW); Yu-Lin Hsueh, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 1012 days.

(21) Appl. No.: 17/572,641

(22) Filed: Jan. 11, 2022

(65) Prior Publication Data

US 2023/0223187 A1 Jul. 13, 2023

(51) Int. Cl.
*H01F 27/34* (2006.01)
*H01F 27/32* (2006.01)

(52) U.S. Cl.
CPC ......... *H01F 27/346* (2013.01); *H01F 27/325* (2013.01)

(58) Field of Classification Search
CPC ............................. H01F 27/346; H01F 27/325
USPC ......................................... 336/192, 198, 195
See application file for complete search history.

(56) References Cited

U.S. PATENT DOCUMENTS 4,583,068 A * 4/1986 Dickens .............. H01F 27/2866 336/212
5,175,525 A * 12/1992 Smith ................. H01F 27/2866 336/83
6,344,786 B1 * 2/2002 Chin ..................... H01F 27/325 336/208
6,527,233 B2 * 3/2003 Maurice ................ F16D 1/0864 248/74.1
7,439,838 B2 * 10/2008 Chen ................... H01F 27/2866 336/198
8,018,314 B2 * 9/2011 Zeng ......................... H01F 5/04 336/198
8,570,768 B2 * 10/2013 Quek ....................... H05K 7/02 361/782
8,698,588 B2 * 4/2014 Park ...................... H01F 27/325 336/208
10,825,604 B1 * 11/2020 Chaparro .............. H01F 27/325
11,380,473 B2 * 7/2022 Ebner ...................... H01F 27/26
(Continued)

FOREIGN PATENT DOCUMENTS

CN 109494062 A 3/2019
JP 05304033 A * 11/1993
(Continued)

*Primary Examiner* — Shawki S Ismail
*Assistant Examiner* — Joselito S. Baisa
(74) *Attorney, Agent, or Firm* — Winston Hsu

(57) ABSTRACT

A magnetic component includes a first core, a second core, an outer bobbin, a first winding, an inner bobbin and a second winding. The outer bobbin is disposed between the first core and the second core. The outer bobbin has a hollow tube portion, a first bottom portion and a first top portion. The first winding is wound around outer side of the hollow tube portion. The inner bobbin is disposed in the hollow tube portion. The inner bobbin has a second bottom portion and a second top portion. The second winding is wound around the inner bobbin. The second bottom portion is exposed to bottom side of the first bottom portion, such that the first bottom portion overlaps the second bottom portion in a height direction of the magnetic component. The second top portion and the second bottom portion abut against inner side of the hollow tube portion.

19 Claims, 9 Drawing Sheets

(56) References Cited

U.S. PATENT DOCUMENTS

| | | | | |
|---|---|---|---|---|
| 2012/0262895 | A1* | 10/2012 | Quek | H05K 3/30 29/606 |
| 2014/0125442 | A1* | 5/2014 | Cheon | H01F 27/29 336/192 |
| 2014/0266528 | A1* | 9/2014 | Yang | H01F 27/24 336/83 |
| 2021/0012943 | A1 | 1/2021 | Ebner | |

FOREIGN PATENT DOCUMENTS

| | | | | |
|---|---|---|---|---|
| JP | 2000243633 | A | * | 9/2000 |
| TW | 201419325 | A | | 5/2014 |
| TW | 202109564 | A | | 3/2021 |

* cited by examiner

MAGNETIC COMPONENT

BACKGROUND OF THE INVENTION

1. Field of the Invention

The invention relates to a magnetic component and, more particularly, to a magnetic component capable of effectively reducing leakage inductance.

2. Description of the Related Art

A transformer is an important magnetic component used for increasing or decreasing voltage. Inmost of circuits, there is always a transformer installed therein. At present, the windings of the transformer used for large current are stacked with each other each other from top to bottom in a core, such that the windings cannot be fully coupled, thereby resulting in a problem of excessive leakage inductance, which increases magnetic interference and loss.

SUMMARY OF THE INVENTION

The invention provides a magnetic component capable of effectively reducing leakage inductance, so as to solve the aforesaid problems.

According to an embodiment of the invention, a magnetic component comprises a first core, a second core, an outer bobbin, a first winding, an inner bobbin and a second winding. The first core has a first inner surface. The second core is disposed on the first core. The second core has a second inner surface, wherein the second inner surface faces the first inner surface. The outer bobbin is disposed between the first core and the second core. The outer bobbin has a hollow tube portion, a first bottom portion and a first top portion. The first bottom portion and the first top portion are located at opposite sides of the hollow tube portion. The first winding is wound around outer side of the hollow tube portion. The inner bobbin is disposed in the hollow tube portion. The inner bobbin has a second bottom portion and a second top portion. The second winding is wound around the inner bobbin. The second bottom portion is exposed to bottom side of the first bottom portion, such that the first bottom portion overlaps the second bottom portion in a height direction of the magnetic component. The second top portion and the second bottom portion abut against inner side of the hollow tube portion.

As mentioned in the above, the first winding is wound around outer side of the hollow tube portion of the outer bobbin and the second winding is wound around the inner bobbin. When the inner bobbin is disposed in the hollow tube portion of the outer bobbin, the second winding is stacked with the first winding from inside to outside, such that the leakage inductance can be effectively reduced. Furthermore, since the second top portion and the second bottom portion of the inner bobbin abut against inner side of the hollow tube portion, the distance between the first winding and the second winding can be kept at a fixed value, so as to ensure the leakage inductance and the magnetizing inductance of the magnetic component. Moreover, since the first bottom portion of the outer bobbin overlaps the second bottom portion of the inner bobbin in the height direction of the magnetic component, the overall height of the magnetic component can be effectively reduced, such that the magnetic component of the invention is beneficial to be miniaturized.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
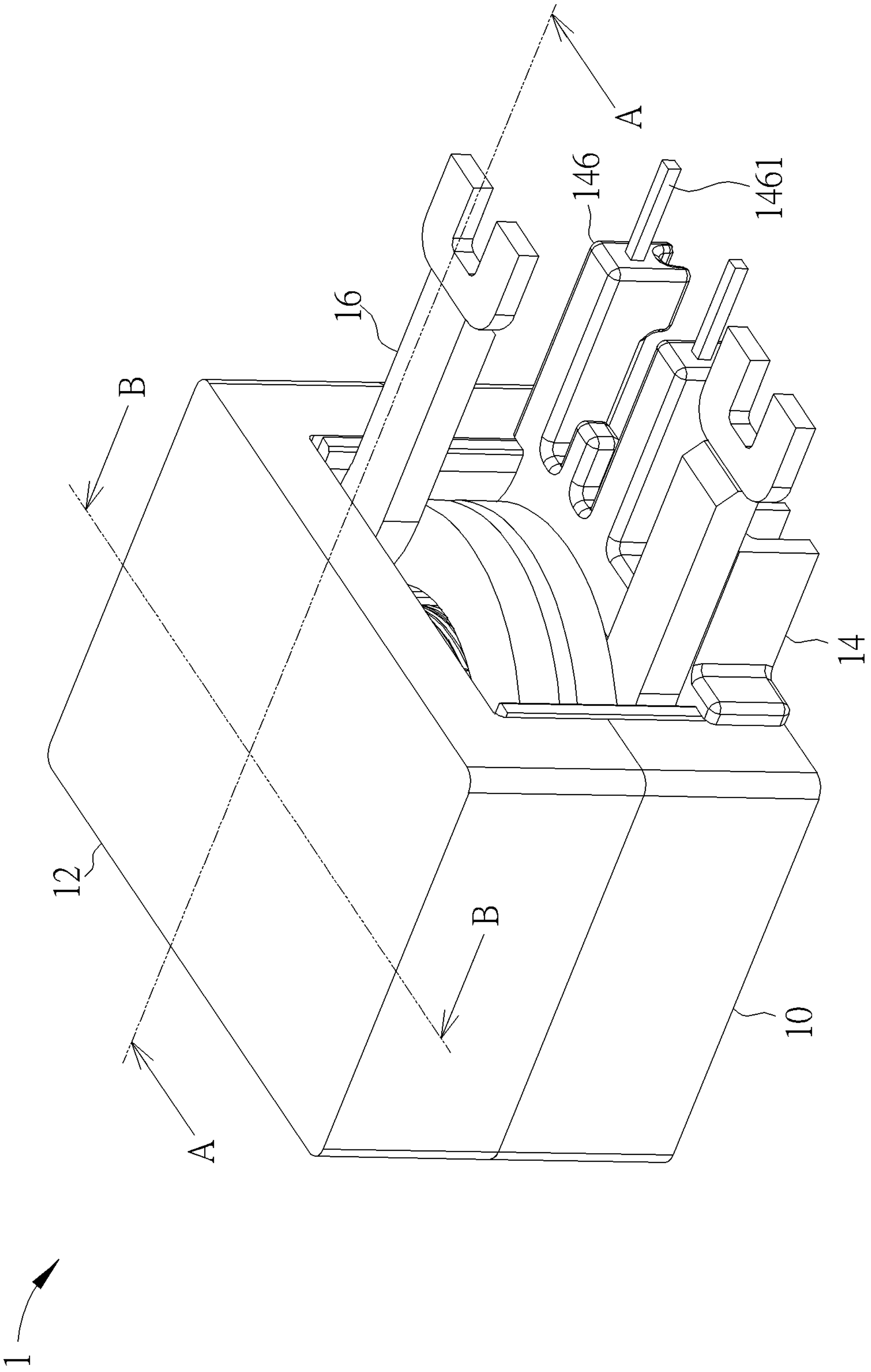
FIG. 1 is a perspective view illustrating a magnetic component according to an embodiment of the invention.
Figure 2:
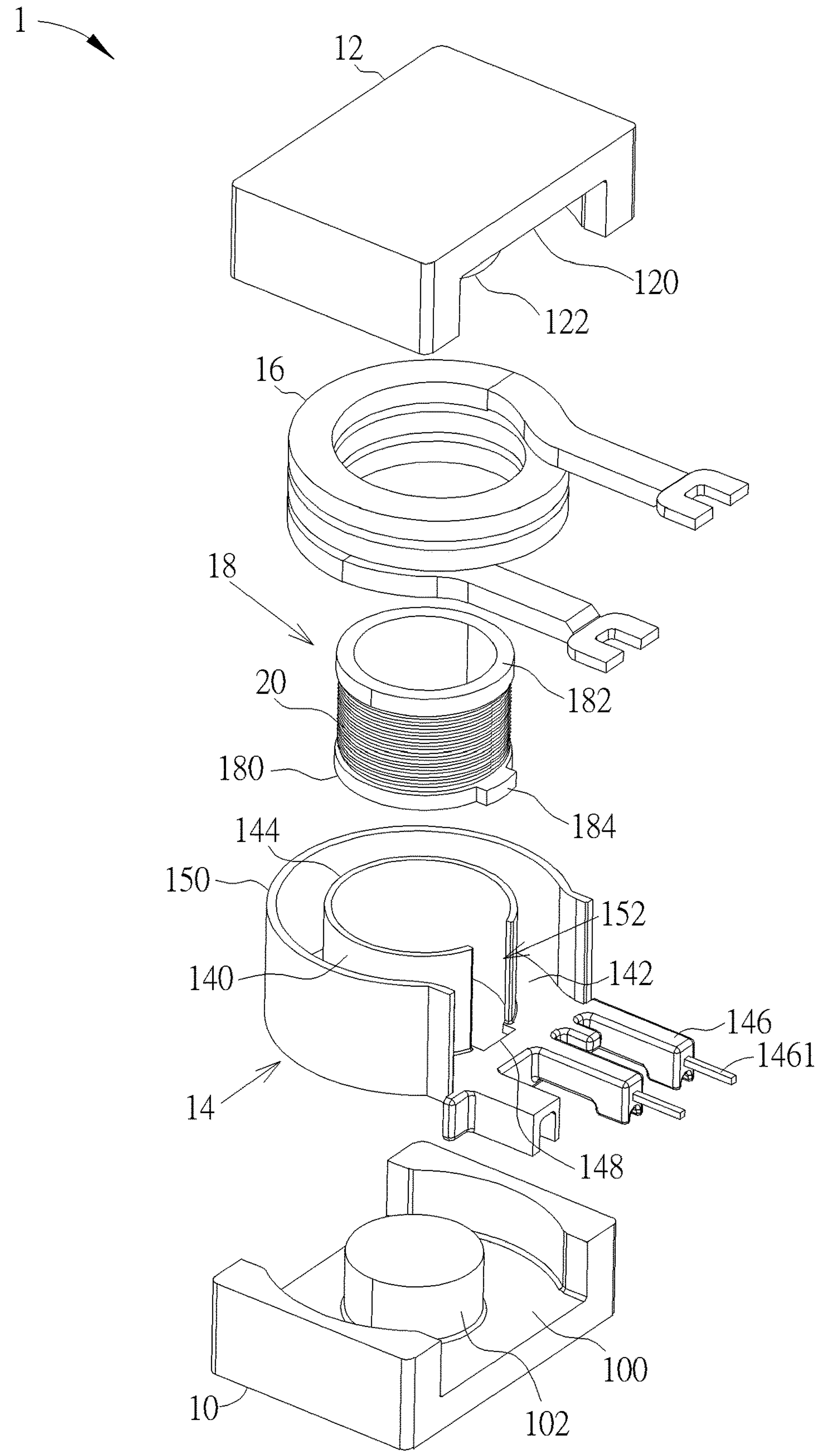
FIG. 2 is an exploded view illustrating the magnetic component shown in FIG. 1.
Figure 3:
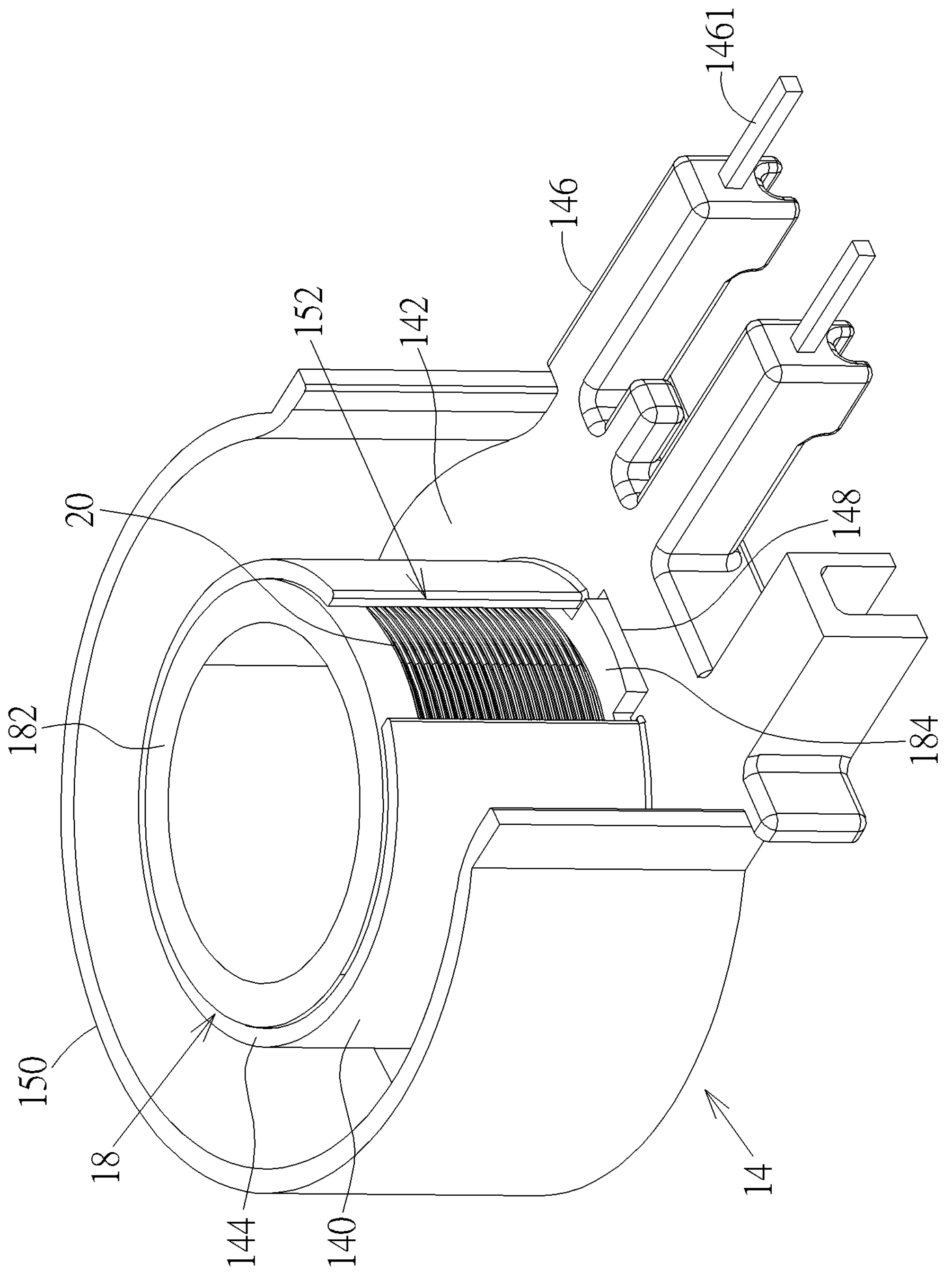
FIG. 3 is a perspective view illustrating an inner bobbin with a second winding disposed in a hollow tube portion of an outer bobbin shown in FIG. 2.
Figure 4:
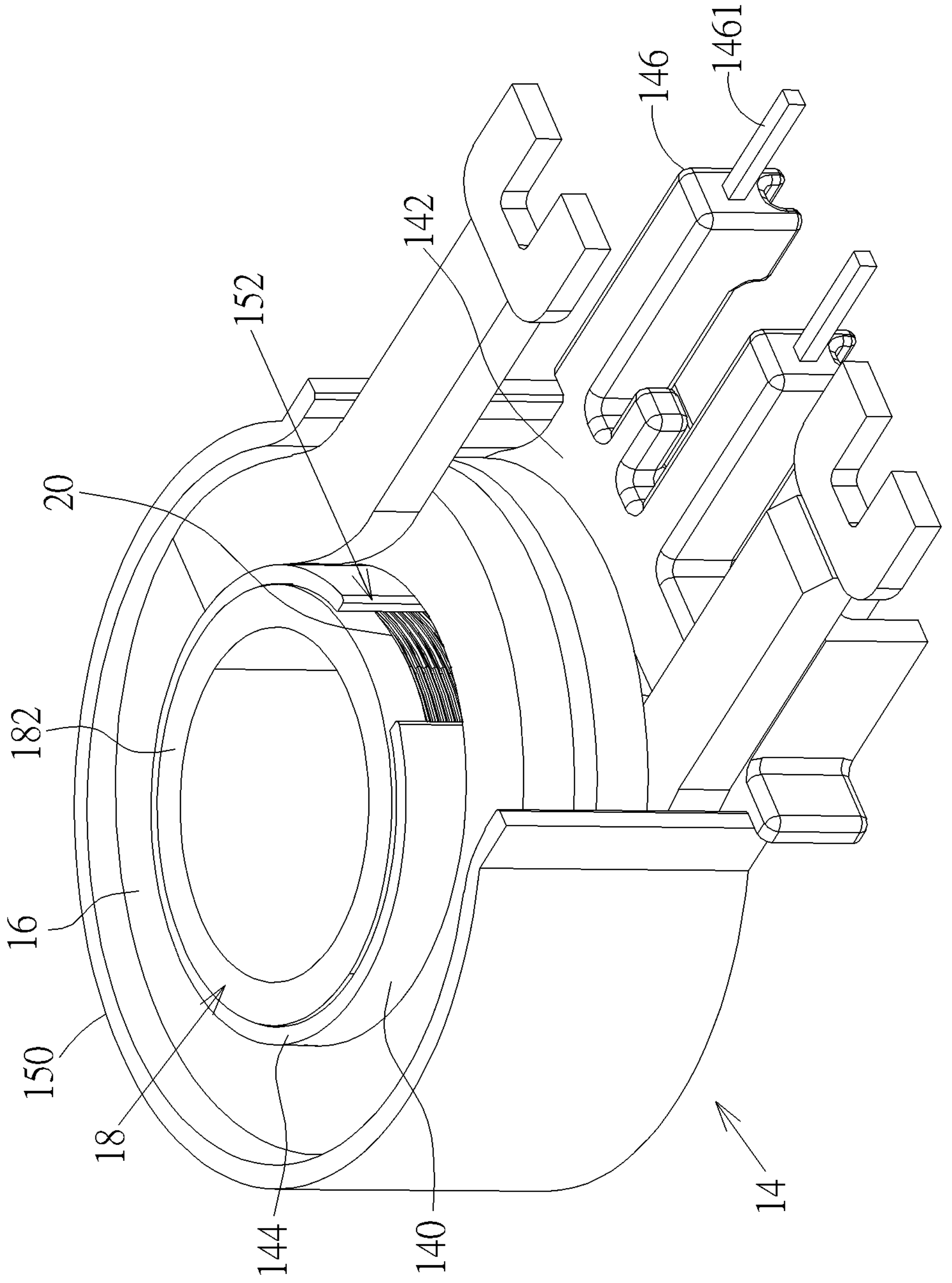
FIG. 4 is a perspective view illustrating a first winding wound around outer side of the hollow tube portion of the outer bobbin shown in FIG. 3.
Figure 5:
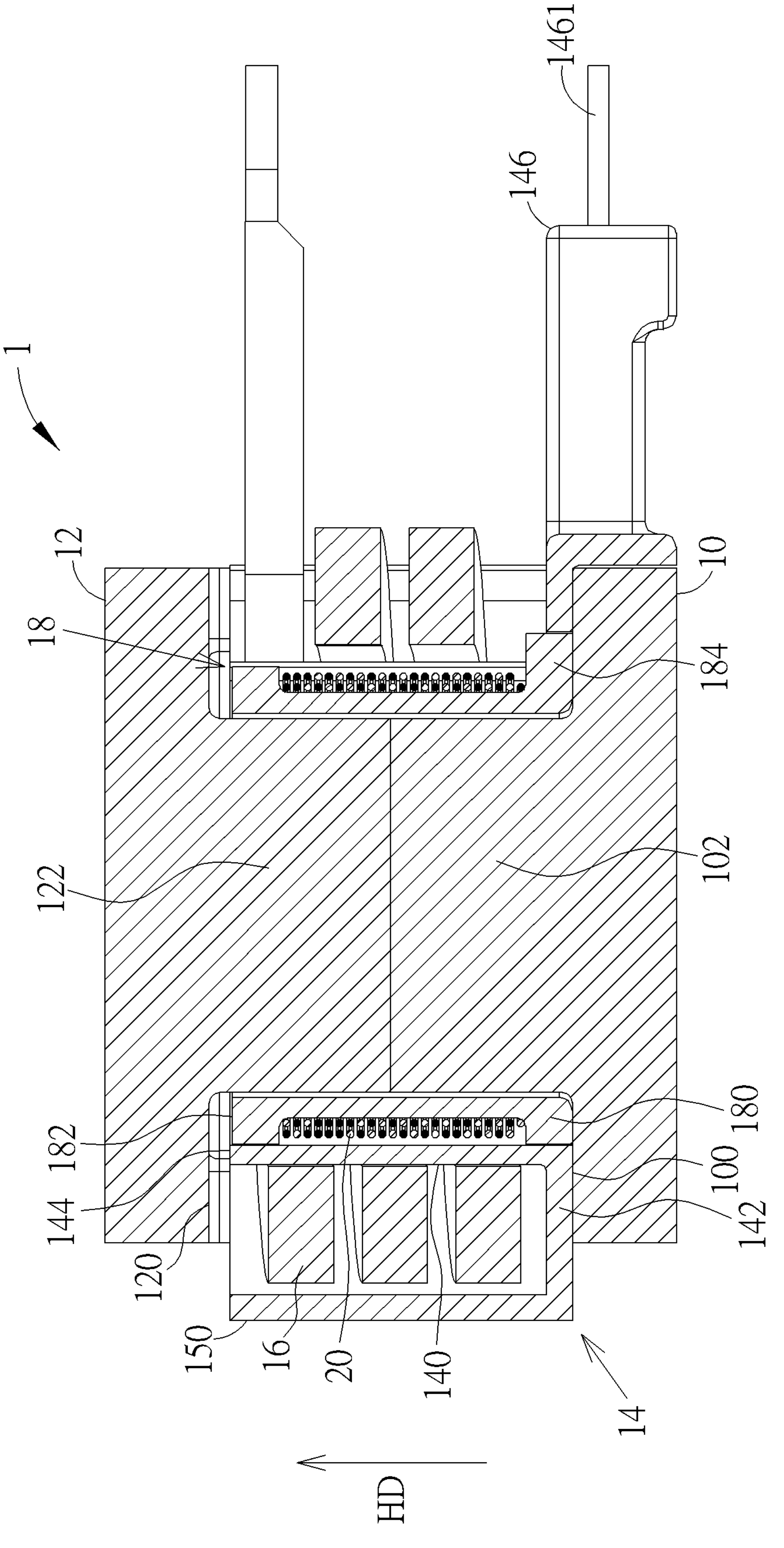
FIG. 5 is a cross-sectional view illustrating the magnetic component shown in FIG. 1.
Figure 6:
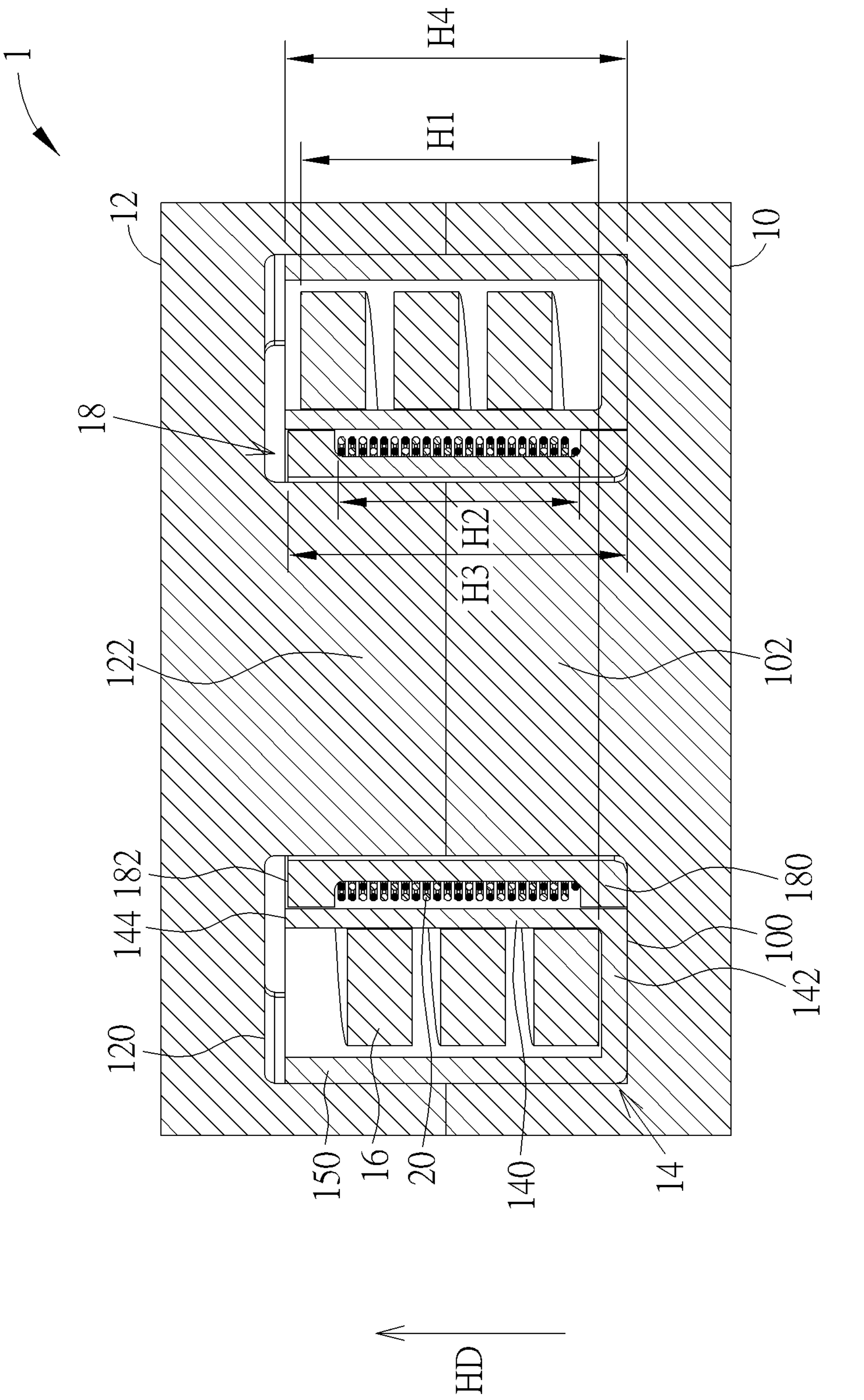
FIG. 6 is a cross-sectional view illustrating the magnetic component shown in FIG. 1.

As shown in FIGS. 1 to 6, FIG. 1 is a perspective view illustrating a magnetic component 1 according to an embodiment of the invention, FIG. 2 is an exploded view illustrating the magnetic component 1 shown in FIG. 1, FIG. 3 is a perspective view illustrating an inner bobbin 18 with a second winding 20 disposed in a hollow tube portion 140 of an outer bobbin 14 shown in FIG. 2, FIG. 4 is a perspective view illustrating a first winding 16 wound around outer side of the hollow tube portion 140 of the outer bobbin 14 shown in FIG. 3, FIG. 5 is a cross-sectional view illustrating the magnetic component 1 shown in FIG. 1 along line A-A, and FIG. 6 is a cross-sectional view illustrating the magnetic component 1 shown in FIG. 1 along line B-B.

As shown in FIGS. 1 and 2, a magnetic component 1 of the invention comprises a first core 10, a second core 12, an outer bobbin 14, a first winding 16, an inner bobbin 18 and a second winding 20. The magnetic component 1 may be a transformer, common mode choke, coupling inductor or other magnetic components according to practical applications.

The first core 10 has a first inner surface 100 and a first pillar 102, wherein the first pillar 102 protrudes from the first inner surface 100. The second core 12 has a second inner surface 120 and a second pillar 122, wherein the second pillar 122 protrudes from the second inner surface 120. In this embodiment, the first core 10 and the second core 12 are E cores, but the invention is not so limited. The types of the first core 10 and the second core 12 may be determined according to practical applications. The second core 12 is disposed on the first core 10, such that the second inner surface 120 faces the first inner surface 100 and the second pillar 122 is aligned with the first pillar 102.

The outer bobbin 14 is disposed between the first core 10 and the second core 12. The outer bobbin 14 has a hollow tube portion 140, a first bottom portion 142, a first top portion 144, a connecting portion 146, a first engaging portion 148 and an insulating portion 150. The first bottom portion 142 and the first top portion 144 are located at opposite sides of the hollow tube portion 140. Accordingly, when the outer bobbin 14 is disposed between the first core 10 and the second core 12, the first bottom portion 142 is close to the first core 10 and the first top portion 144 is close to the second core 12. The connecting portion 146 protrudes from a bottom of the outer bobbin 14 in the horizontal direction. In this embodiment, the hollow tube 140 has a winding outlet 152, wherein a position of the winding outlet 152 corresponds to a position of the connecting portion 146. In this embodiment, the winding outlet 152 extends to the first bottom portion 142 and the first engaging portion 148 is disposed at the bottom of the winding outlet 152, such that a position of the first engaging portion 148 also corresponds to the position of the connecting portion 146. The insulating portion 150 surrounds the hollow tube portion 140.

The inner bobbin 18 is disposed in the hollow tube portion 140 of the outer bobbin 14. The inner bobbin 18 has a second bottom portion 180, a second top portion 182 and a second engaging portion 184. The second bottom portion 180 and the second top portion 182 are located at opposite sides of the inner bobbin 18. Accordingly, when the inner bobbin 18 is disposed in the hollow tube portion 140 of the outer bobbin 14, the second bottom portion 180 is close to the first core 10 and the second top portion 182 is close to the second core 12. The second engaging portion 184 is disposed at the second bottom portion 180.

In this embodiment, the first engaging portion 148 of the outer bobbin 14 may be a recess and the second engaging portion 184 of the inner bobbin 18 may be a protrusion. However, in another embodiment, the first engaging portion 148 of the outer bobbin 14 may be a protrusion and the second engaging portion 184 of the inner bobbin 18 may be a recess. That is to say, according to practical applications, one of the first engaging portion 148 and the second engaging portion 184 may be a recess and the other one of the first engaging portion 148 and the second engaging portion 184 may be a protrusion. Furthermore, the shape of the first engaging portion 148 corresponds to the shape of the second engaging portion 184.

To assemble the magnetic component 1, the second winding 20 may be wound around the inner bobbin 18 first. Then, the inner bobbin 18 with the second winding 20 is disposed into the hollow tube portion 140 of the outer bobbin 14 by aligning and engaging the second engaging portion 184 with the first engaging portion 148, as shown in FIG. 3. In this embodiment, the inner bobbin may be wholly disposed within the hollow tube portion 140 of the outer bobbin 14. Since the first engaging portion 148 engages with the second engaging portion 184, the inner bobbin 18 can be stably disposed in the hollow tube portion 140 of the outer bobbin 14 without rotation. In this embodiment, the position of the first engaging portion 148 corresponds to the position of the connecting portion 146. When the second winding 20 is wound around the inner bobbin 18, the winding end (not shown) of the second winding 20 may be retained at a position corresponding to the second engaging portion 184. Accordingly, after the second engaging portion 184 is aligned and engaged with the first engaging portion 148, the winding end of the second winding 20 can be connected to the pins 1461 of the connecting portion 146 of the outer bobbin 14 through the winding outlet 152.

Then, the first winding 16 is wound around outer side of the hollow tube portion 140 of the outer bobbin 14, as shown in FIG. 4. At this time, the first winding 16 is located between the insulating portion 150 and the hollow tube portion 140 of the outer bobbin 14. Furthermore, the second winding 20 is stacked with the first winding 16 from inside to outside. In this embodiment, a total height H1 of the first winding 16 is larger than a total height H2 of the second winding 20, and a cross-sectional area of the first winding 16 is larger than a cross-sectional area of the second winding 20, as shown in FIGS. 5 and 6.

Then, the first pillar 102 of the first core 10 and the second pillar 122 of the second core 12 are inserted into the inner bobbin 18 to complete the assembly of the magnetic component 1, as shown in FIGS. 5 and 6. After completing the assembly of the magnetic component 1, the second bottom portion 180 of the inner bobbin 18 is exposed to bottom side of the first bottom portion 142 of the outer bobbin 14, such that the first bottom portion 142 overlaps the second bottom portion 180 in a height direction HD of the magnetic component 1. In this embodiment, a bottom surface of the first bottom portion 142 is flush with a bottom surface of the second bottom portion 180, such that the first bottom portion 142 and the second bottom portion 180 abut against the first inner surface 100 of the first core 10 simultaneously. Accordingly, the overall height of the magnetic component 1 can be effectively reduced, such that the magnetic component 1 of the invention is beneficial to be miniaturized.

In this embodiment, a height H3 of the inner bobbin 18 is smaller than a height H4 of the outer bobbin 14. However, in another embodiment, the height H3 of the inner bobbin 18 may be equal to the height H4 of the outer bobbin 14. That is to say, the first top portion 144 of the outer bobbin 14 may be flush with the second top portion 182 of the inner bobbin 18, such that the first top portion 144 and the second top portion 182 may abut against the second inner surface 120 of the second core 12 simultaneously, so as to further miniaturize the magnetic component 1.

As shown in FIG. 6, the second top portion 182 and the second bottom portion 180 of the inner bobbin 18 abut against inner side of the hollow tube portion 140 of the outer bobbin 14, such that the distance between the first winding 16 and the second winding 20 can be kept at a fixed value, so as to ensure the leakage inductance and the magnetizing inductance of the magnetic component 1. Furthermore, as shown in FIGS. 5 and 6, the first core 10 and the second core 12 may fully cover the hollow tube portion 140 of the outer bobbin 14 and the inner bobbin 18, so as to further improve the leakage inductance and magnetizing inductance of the magnetic component 1. For example, when the first winding 16 is wound by 3 circles and the second winding 20 is wound by 45 circles, the leakage inductance may reduce from 0.22 μH to 0.08 μH. Furthermore, in some embodiments, if higher and more accurate leakage inductance is needed, the invention may easily increase the leakage inductance to 0.15 μH in a stable state with less error by increasing the lengths of the second bottom portion 180 and the second top portion 182 extending outward and/or adjusting the thicknesses of the second bottom portion 180 and the second top portion 182 in the height direction HD.

Figure 7:
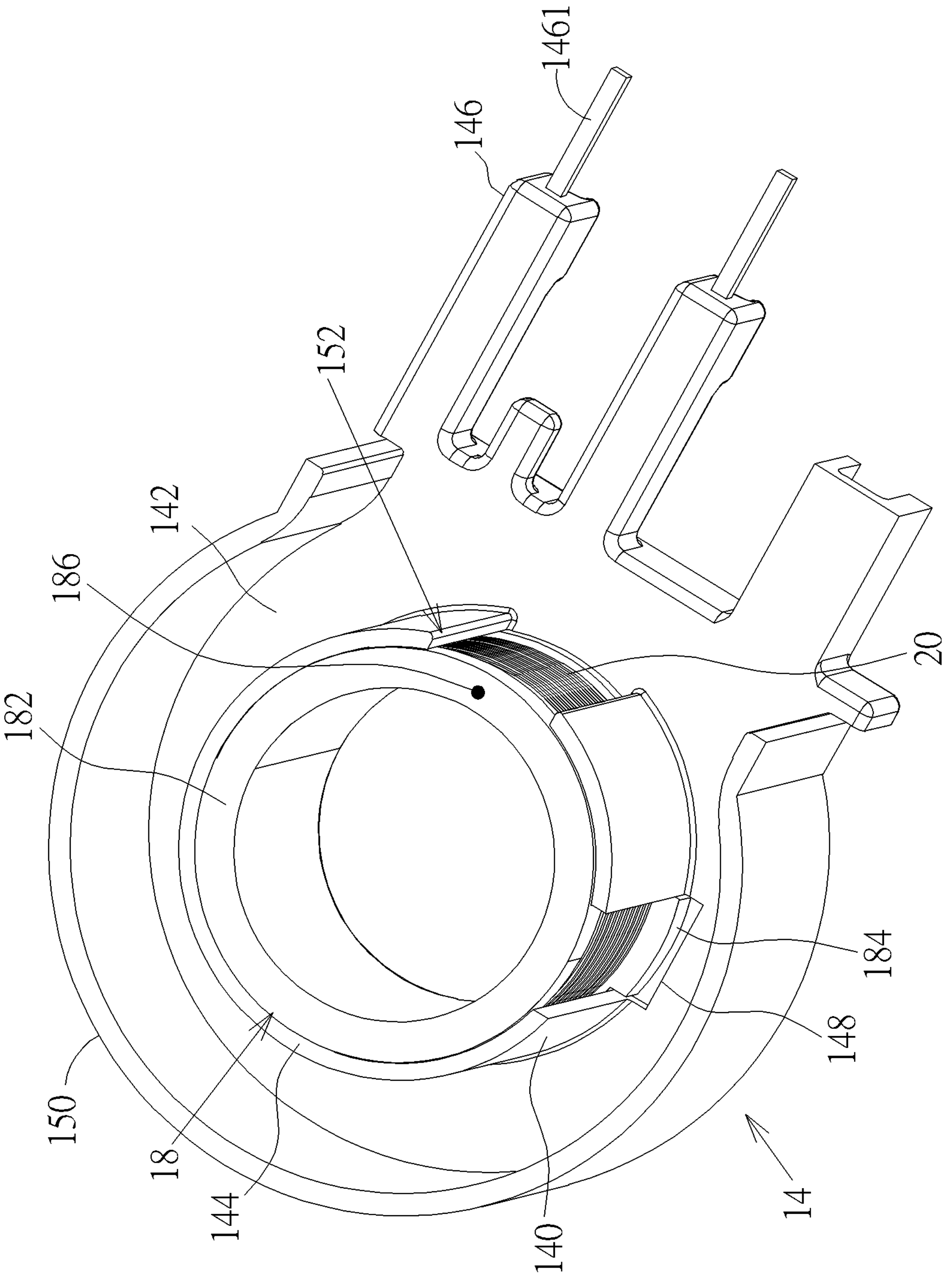
FIG. 7 is a perspective view illustrating an inner bobbin with a second winding disposed in a hollow tube portion of an outer bobbin according to another embodiment of the invention.

Referring to FIG. 7, FIG. 7 is a perspective view illustrating an inner bobbin 18 with a second winding 20 disposed in a hollow tube portion 140 of an outer bobbin 14 according to another embodiment of the invention.

As shown in FIG. 7, the inner bobbin 18 has a winding mark 186. Furthermore, the first engaging portion 148 is staggered with the winding outlet 152 by an angle (e.g. 90 degrees). To assemble the inner bobbin 18 and the outer bobbin 14, the inner bobbin 18 with the second winding 20 is disposed into the hollow tube portion 140 of the outer bobbin 14 by aligning and engaging the second engaging portion 184 with the first engaging portion 148, as shown in FIG. 7. In this embodiment, the position of the winding outlet 152 still corresponds to the position of the connecting portion 146, and a position of the winding mark 186 also corresponds to the position of the connecting portion 146 when the inner bobbin 18 is disposed in the hollow tube portion 140 of the outer bobbin 14. Thus, when the second winding 20 is wound around the inner bobbin 18, the winding end (not shown) of the second winding 20 may be retained at a position corresponding to the winding mark 186. Accordingly, after the second engaging portion 184 is aligned and engaged with the first engaging portion 148, the winding end of the second winding 20 can be connected to the pins 1461 of the connecting portion 146 of the outer bobbin 14 through the winding outlet 152.

Figure 8:
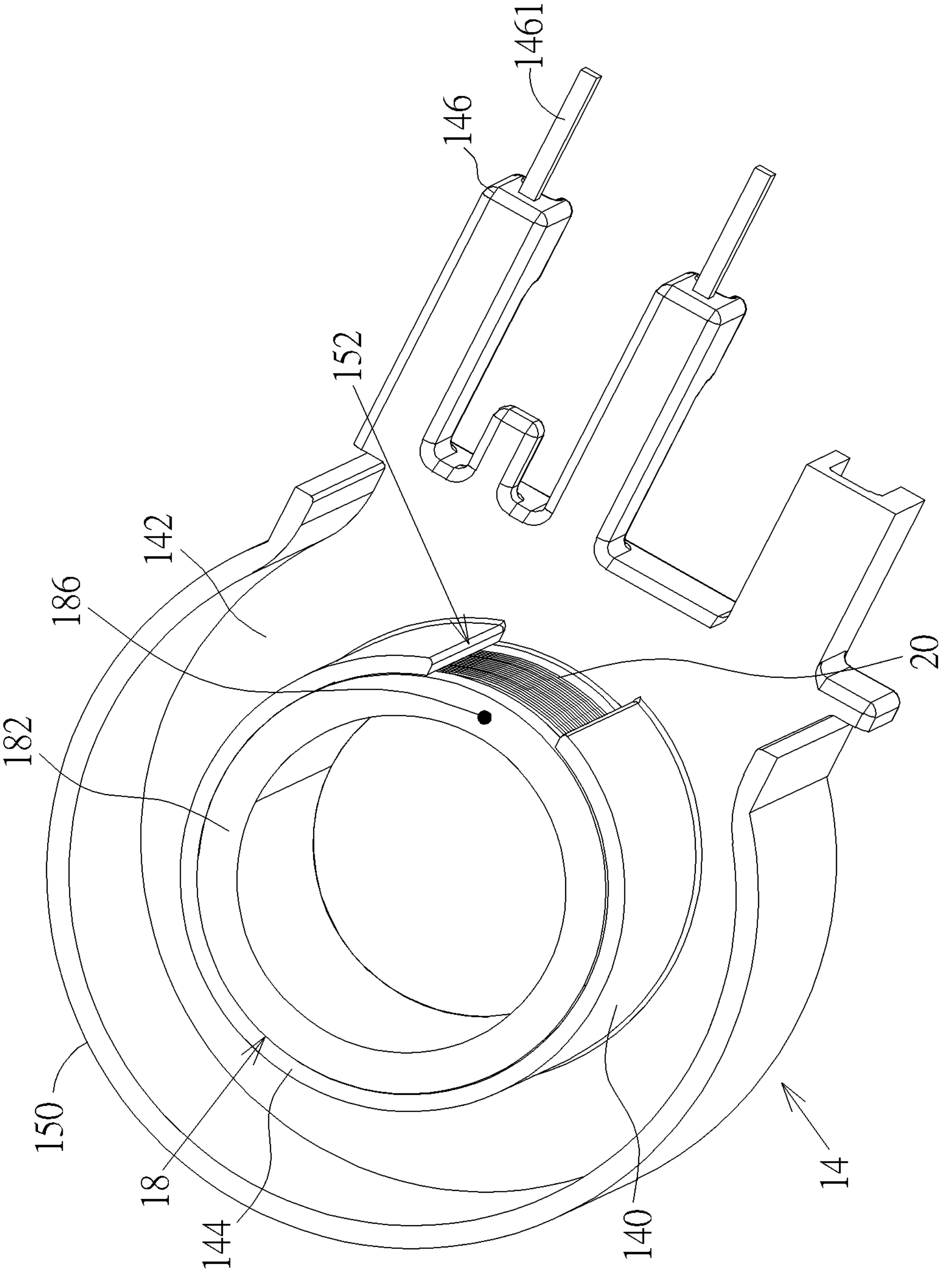
FIG. 8 is a perspective view illustrating an inner bobbin with a second winding disposed in a hollow tube portion of an outer bobbin according to another embodiment of the invention.
Figure 9:
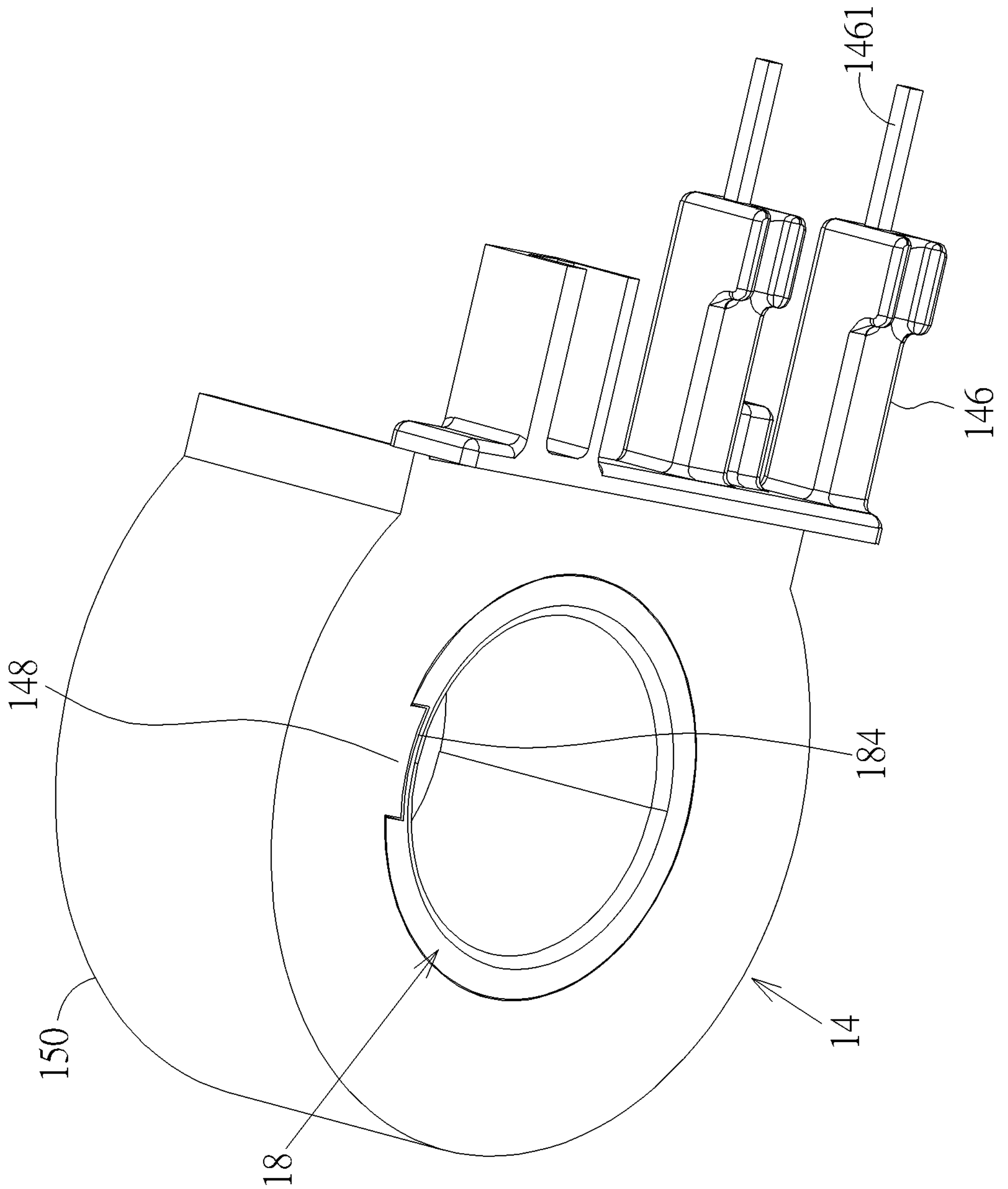
FIG. 9 is a perspective view illustrating the inner bobbin and the outer bobbin shown in FIG. 8 from another viewing angle.

Referring to FIGS. 8 and 9, FIG. 8 is a perspective view illustrating an inner bobbin 18 with a second winding 20 disposed in a hollow tube portion 140 of an outer bobbin 14 according to another embodiment of the invention and FIG. 9 is a perspective view illustrating the inner bobbin 18 and the outer bobbin 14 shown in FIG. 8 from another viewing angle.

As shown in FIG. 8, the inner bobbin 18 has a winding mark 186. Furthermore, as shown in FIGS. 8 and 9, the first engaging portion 148 is staggered with the winding outlet 152 by an angle (e.g. 90 degrees). In this embodiment, the first engaging portion 148 of the outer bobbin 14 is a protrusion and the second engaging portion 184 of the inner bobbin 18 is a recess. To assemble the inner bobbin 18 and the outer bobbin 14, the inner bobbin 18 with the second winding 20 is disposed into the hollow tube portion 140 of the outer bobbin 14 by aligning and engaging the second engaging portion 184 with the first engaging portion 148, as shown in FIG. 9. In this embodiment, the position of the winding outlet 152 still corresponds to the position of the connecting portion 146, and a position of the winding mark 186 also corresponds to the position of the connecting portion 146 when the inner bobbin 18 is disposed in the hollow tube portion 140 of the outer bobbin 14. Thus, when the second winding 20 is wound around the inner bobbin 18, the winding end (not shown) of the second winding 20 may be retained at a position corresponding to the winding mark 186. Accordingly, after the second engaging portion 184 is aligned and engaged with the first engaging portion 148, the winding end of the second winding 20 can be connected to the pins 1461 of the connecting portion 146 of the outer bobbin 14 through the winding outlet 152.

As mentioned in the above, the first winding is wound around outer side of the hollow tube portion of the outer bobbin and the second winding is wound around the inner bobbin. When the inner bobbin is disposed in the hollow tube portion of the outer bobbin, the second winding is stacked with the first winding from inside to outside, such that the leakage inductance can be effectively reduced. Furthermore, since the second top portion and the second bottom portion of the inner bobbin abut against inner side of the hollow tube portion, the distance between the first winding and the second winding can be kept at a fixed value, so as to ensure the leakage inductance and the magnetizing inductance of the magnetic component. Moreover, since the first bottom portion of the outer bobbin overlaps the second bottom portion of the inner bobbin in the height direction of the magnetic component, the overall height of the magnetic component can be effectively reduced, such that the magnetic component of the invention is beneficial to be miniaturized. In addition, the invention may utilize the second engaging portion or the winding mark to indicate where the winding end of the second winding should be retained at according to whether the first engaging portion is staggered with the winding outlet.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic component comprising:

a first core having a first inner surface;

a second core disposed on the first core, the second core having a second inner surface, the second inner surface facing the first inner surface;

an outer bobbin disposed between the first core and the second core, the outer bobbin having a hollow tube portion, a first bottom portion and a first top portion, the first bottom portion and the first top portion being located at opposite sides of the hollow tube portion, the hollow tube portion has a winding outlet, the winding outlet corresponding to an opening of a combination of the first core and the second core;

a first winding wound around outer side of the hollow tube portion;

an inner bobbin disposed in the hollow tube portion, the inner bobbin and the outer bobbin being not formed in one-piece structure, the inner bobbin having a second bottom portion and a second top portion, the first core and the second core fully covering the hollow tube portion and the inner bobbin, the second bottom portion extending towards the first bottom portion or the winding outlet, the second top portion extending towards the first top portion or the winding outlet; and a second winding wound around the inner bobbin, a winding end of the second winding extending laterally out of the winding outlet of the hollow tube portion, the outer bobbin, and the opening of the combination of the first core and the second core, the winding end of the second winding extending from between the second bottom portion and the second top portion, the first core and the second core through the winding outlet of the hollow tube portion and the opening of the combination of the first core and the second core;

wherein the second bottom portion is exposed to bottom side of the first bottom portion, such that the first bottom portion overlaps the second bottom portion in a height direction of the magnetic component; the second top portion and the second bottom portion abut against inner side of the hollow tube portion.

2. The magnetic component of claim 1, wherein the second winding is stacked with the first winding from inside to outside.

3. The magnetic component of claim 1, wherein a bottom surface of the first bottom portion is flush with a bottom surface of the second bottom portion.

4. The magnetic component of claim 1, wherein the first bottom portion and the second bottom portion abut against the first inner surface simultaneously.

5. The magnetic component of claim 1, wherein a height of the inner bobbin is smaller than or equal to a height of the outer bobbin.

6. The magnetic component of claim 1, wherein the inner bobbin is wholly disposed within the hollow tube portion.

7. The magnetic component of claim 1, wherein the first top portion is flush with the second top portion, such that the first top portion and the second top portion abut against the second inner surface simultaneously.

8. The magnetic component of claim 1, wherein the outer bobbin has a first engaging portion, the inner bobbin has a second engaging portion, and the first engaging portion engages with the second engaging portion.

9. The magnetic component of claim 8, wherein one of the first engaging portion and the second engaging portion is a recess and the other one of the first engaging portion and the second engaging portion is a protrusion.

10. The magnetic component of claim 8, wherein the outer bobbin has a connecting portion, the connecting portion protrudes from a bottom of the outer bobbin, and a position of the first engaging portion corresponds to a position of the connecting portion.

11. The magnetic component of claim 1, wherein the outer bobbin has a connecting portion, the connecting portion protrudes from a bottom of the outer bobbin, the inner bobbin has a winding mark, and a position of the winding mark corresponds to a position of the connecting portion when the inner bobbin is disposed in the hollow tube portion.

12. The magnetic component of claim 1, wherein the outer bobbin has a connecting portion, the connecting portion protrudes from a bottom of the outer bobbin, and a position of the winding outlet corresponds to a position of the connecting portion.

13. The magnetic component of claim 12, wherein the winding outlet extends to the first bottom portion.

14. The magnetic component of claim 1, wherein a total height of the first winding is larger than a total height of the second winding.

15. The magnetic component of claim 1, wherein a cross-sectional area of the first winding is larger than a cross-sectional area of the second winding.

16. The magnetic component of claim 1, wherein the outer bobbin has an insulating portion, the insulating portion surrounds the hollow tube portion, and the first winding is located between the insulating portion and the hollow tube portion.

17. The magnetic component of claim 16, wherein the second engaging portion of the inner bobbin only extends within the insulating portion.

18. The magnetic component of claim 1, wherein the inner bobbin does not extend out of the outer bobbin.

19. The magnetic component of claim 1, wherein the second bottom portion of the inner bobbin only extends within the hollow tube portion.

* * * * *